(12) United States Patent
Mahaney et al.

(10) Patent No.: US 8,845,036 B2
(45) Date of Patent: Sep. 30, 2014

(54) SIGNAL CONTROL DEVICE

(75) Inventors: Shawn D. Mahaney, Greenville, SC (US); James L. Few, Jr., Easley, SC (US)

(73) Assignee: Amsted Rail—Faiveley, LLC, Chicago, IL (US)

( * ) Notice: Subject to any disclaimer, the term of this patent is extended or adjusted under 35 U.S.C. 154(b) by 542 days.

(21) Appl. No.: 12/370,330

(22) Filed: Feb. 12, 2009

(65) Prior Publication Data

US 2010/0007203 A1 Jan. 14, 2010

Related U.S. Application Data

(60) Provisional application No. 61/079,954, filed on Jul. 11, 2008.

(51) Int. Cl.
- *B60T 13/00* (2006.01)
- *B60T 8/38* (2006.01)
- *B60T 8/18* (2006.01)

(52) U.S. Cl.
CPC ................................. *B60T 8/1893* (2013.01)
USPC ...................................... 303/9.72; 303/117.1

(58) Field of Classification Search
USPC .......... 303/22.1, 22.6–22.8, 117.1, 186, 9.62, 303/9.69, 9.72; 251/63.4; 137/488, 492.5, 137/557
See application file for complete search history.

(56) References Cited

U.S. PATENT DOCUMENTS

| | | | |
|---|---|---|---|
| 4,024,712 A * | 5/1977 | Takeuchi | 60/535 |
| 4,159,853 A * | 7/1979 | Oberthuer et al. | 303/9.72 |
| 4,316,639 A * | 2/1982 | Schafer | 303/9.72 |
| 4,509,800 A * | 4/1985 | Kubota | 303/9.72 |
| 5,039,174 A | 8/1991 | Beacon et al. | |
| 5,106,168 A * | 4/1992 | McKay | 303/22.2 |
| 5,211,450 A * | 5/1993 | Gayfer et al. | 303/22.2 |
| 5,269,595 A * | 12/1993 | McKay et al. | 303/22.2 |
| 5,551,766 A | 9/1996 | Brushwood | |
| 6,305,756 B1 * | 10/2001 | Scott et al. | 303/22.2 |
| 6,390,566 B1 * | 5/2002 | Matsuno | 303/9.64 |
| 6,666,528 B1 * | 12/2003 | Gayfer et al. | 303/9.69 |
| 2008/0000334 A1 * | 1/2008 | Reiche et al. | 82/105 |
| 2010/0007203 A1 * | 1/2010 | Mahaney et al. | 303/22.7 |

OTHER PUBLICATIONS

Office Action dated Nov. 29, 2012 for co-pending Canadian Patent Application No. 2,654,846.

* cited by examiner

*Primary Examiner* — Vishal Sahni
(74) *Attorney, Agent, or Firm* — Dority & Manning, P.A.

(57) ABSTRACT

The present invention is directed to a signal control device having a body with a generally cylindrical cavity having a longitudinal central axis, a first and second input, and a first and second output. Each input and output is in fluid communication with the body. The signal control device further contains a first spool with a first end and an opposite second end, each which define a recess, a central axis between the first and second ends and a through hole formed about the central axis. The signal control device also contains a second spool with a first end, an opposite second end, a second central axis between the first and second ends, and a bore. The bore has a first end opening at the first end of the second spool and has a second end opening intermediate the first and second ends of the second spool. The first spool and second spool are positioned within the body cavity so that their corresponding central axes are collinear.

18 Claims, 8 Drawing Sheets

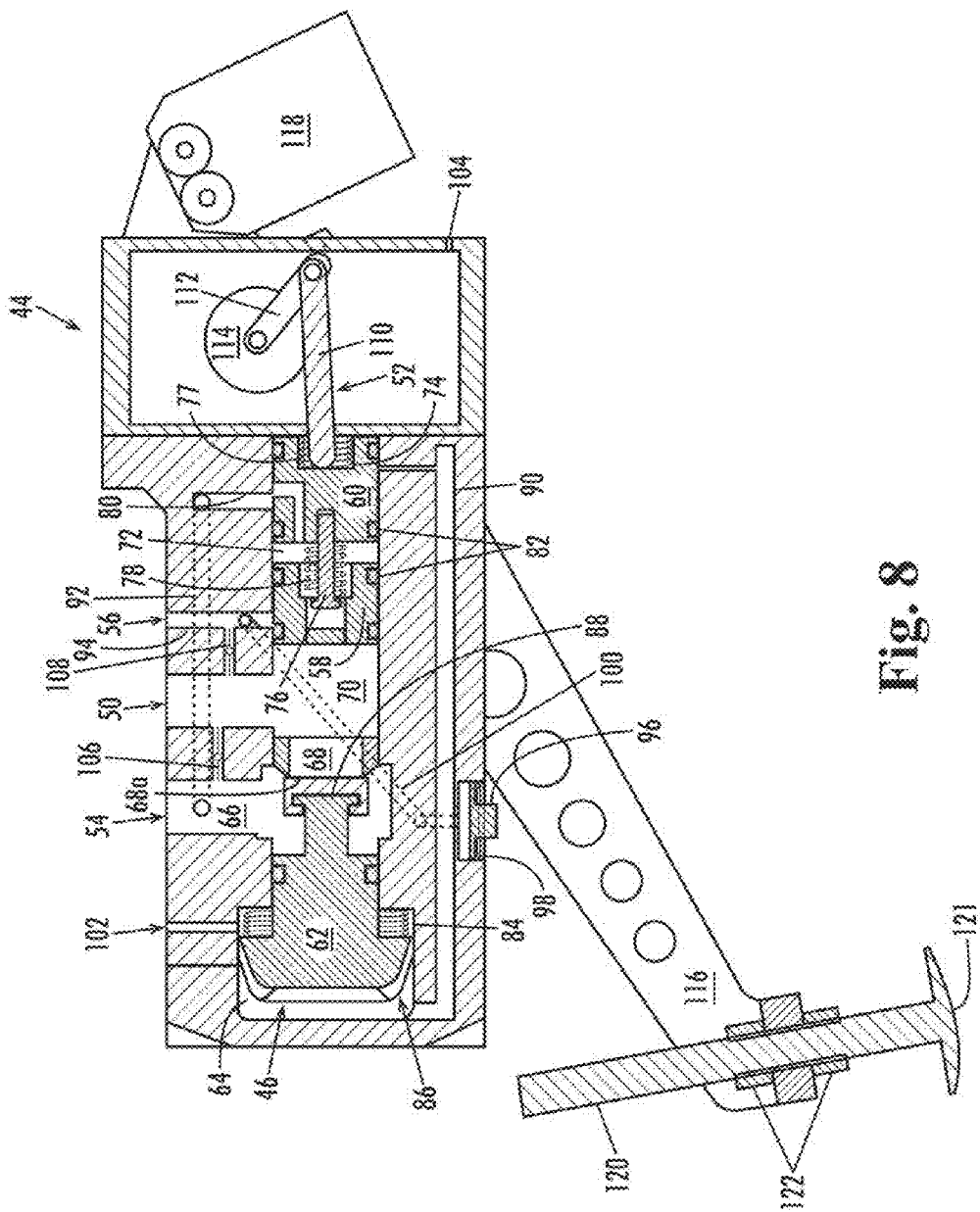

SIGNAL CONTROL DEVICE

CLAIM OF PRIORITY

The present application claims priority to U.S. Provisional Patent Application Ser. No. 61/079,954, filed Jul. 11, 2008, entitled SIGNAL CONTROL DEVICE, the entire disclosure of which is incorporated by reference herein.

FIELD OF THE INVENTION

The present invention relates to the field of signal control devices in general, and more particularly to a signal control device for use as a proportional valve for controlling the braking force applied to railway car wheels.

BACKGROUND OF THE INVENTION

Signal control devices are used for a variety of applications, including control of the braking force applied to railway cars. Railway cars necessitate variations in braking power based on the weight of the contents in the railway car. If an inappropriate amount of braking force is applied to the railway car, the car may not stop or may shake along the track possibly leading to disengagement between the wheels and the track. In addition, when excessive brake force is applied, flat spots may form on the wheels that can result in catastrophic vibrations.

Currently, particular signal control devices known as proportional valves are used to apply variations in braking power to railway cars. In many instances, the proportional valve is connected directly to the railway car and has mechanical components for measuring the weight of the car. Based on the measurement of the weight, the proportional valve works to apply the appropriate amount of braking power to the railway car.

SUMMARY OF THE INVENTION

The present invention recognizes and addresses disadvantages of prior art constructions and methods. The present invention is directed to a signal control device having a body with a generally cylindrical cavity having a longitudinal central axis, a first and second input, and a first and second output. Each input and output is in fluid communication with the body cavity. The signal control device further contains a first spool with a first end and an opposite second end, each of which defines a recess, a central axis between the first and second ends and a through hole formed about the central axis. The signal control device also contains a second spool with a first end, an opposite second end, a second central axis between the first and second ends, and a bore. The bore has a first end opening at the first end of the second spool and has a second end opening intermediate the first and second ends of the second spool. The first spool and second spool are positioned within the body cavity so that their corresponding central axes are collinear.

The present invention is additionally directed to a signal control device having a body with a generally cylindrical cavity having a longitudinal central axis, an input and an output. The input and output are in fluid communication with the body. The signal control device further contains a first spool with a first end, an opposite second end and a central axis between the first and second ends. The signal control device also contains a second spool which is operatively connected to the first spool, so that they may move relative to one another. The second spool contains a first end, an opposite second end, a second central axis between the first and second ends, and a bore. The bore has a first end opening at the first end of the second spool and has a second end opening intermediate the first and second ends of the second spool. The first spool and second spool are positioned within the body cavity so that their corresponding central axes are collinear and so that the first opening of the bore is positioned intermediate the second end of the first spool and the first end of the second spool.

The present invention is further directed to a railway car having a proportional valve for controlling the braking force applied to the railway car wheels. The railway car contains a chassis, a first and second set of wheels operatively coupled to the chassis, and a brake operatively connected to at least one of the first and second set of wheels. The brake contains a brake cylinder and a proportional valve operatively connected the brake cylinder and the chassis. The proportional valve contains a body with a generally cylindrical cavity defining a central axis and a first input and a first output, each in fluid communication with the cavity. The proportional valve also contains a first spool with a first end, an opposite second end, and a first central axis therebetween. The proportional valve also has a second spool which is operatively connected to the first spool so that they may move relative to one another. The second spool contains a first end, an opposite second end, a central axis formed between the ends, and a bore. The bore contains a first opening at the first end of the second spool and contains a second opening intermediate the first and second ends of the second spool. The proportional valve also contains a piston with a first end, an opposite second, and a central longitudinal axis between the first and second ends. The first spool, the second spool, and the piston are operatively received and positioned in the body so that each central axis of the first spool, the second spool, and the piston are collinear. The first spool, second spool, and piston are also positioned so that the first opening of the bore is positioned intermediate the second end of the first spool and the first end of the second spool.

BRIEF DESCRIPTION OF THE DRAWINGS

A full and enabling disclosure of the present invention, including the best mode thereof directed to one of ordinary skill in the art, is set forth in the specification, which refers to the appended FIGS. 1-8, in which:

FIG. 8 is a cross-sectional view of the proportional valve of FIG. 4 with its components in a third position;

Figure 1:
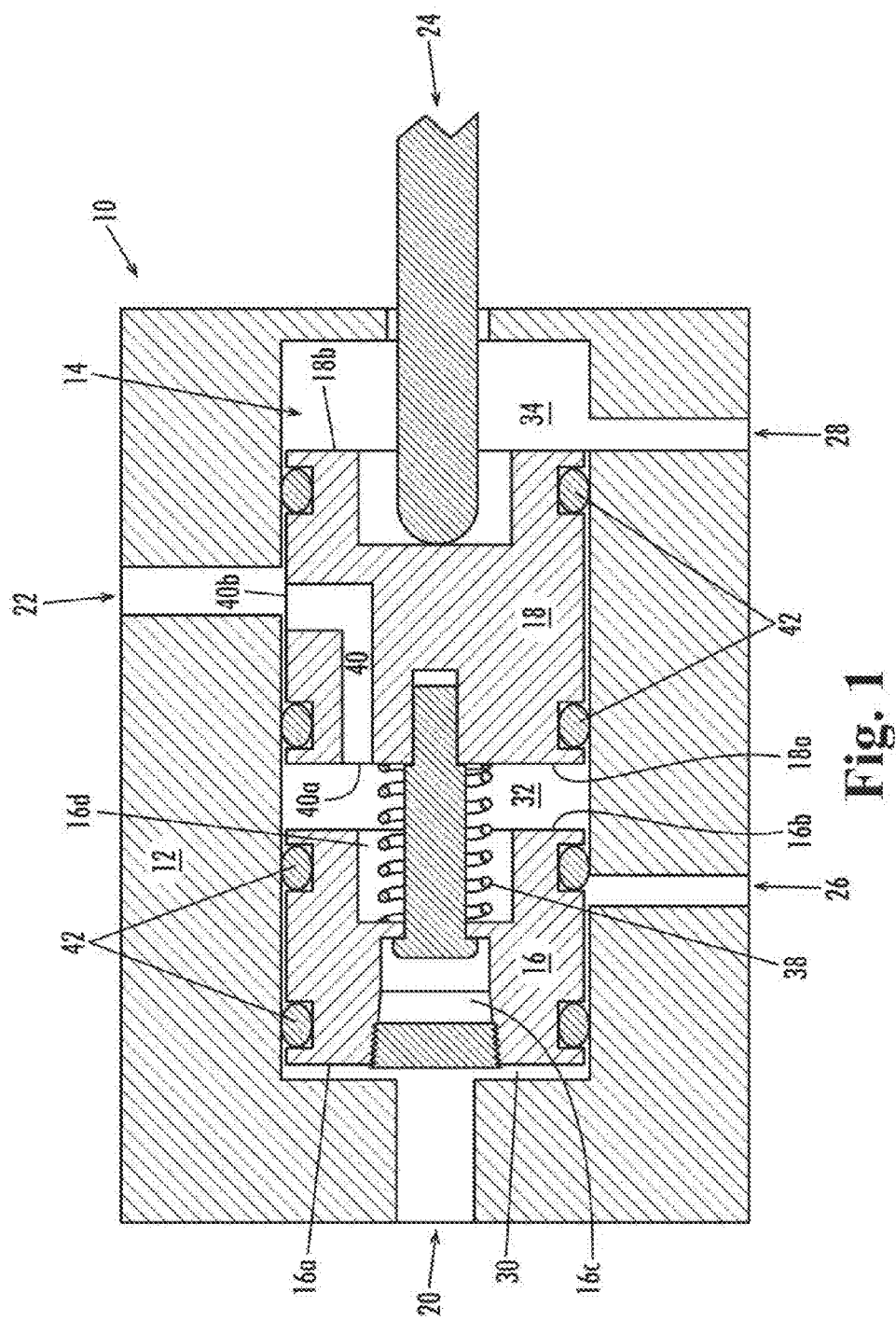
FIG. 1 is a cross-sectional view of a signal control device with its components in a first position in accordance with an embodiment of the present invention.

Repeat use of reference characters in the present specification and drawings is intended to represent same or analogous features or elements of the invention according to the disclosure.

DETAILED DESCRIPTION OF THE INVENTION

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope and spirit thereof. For instance, features illustrated or described as part of one embodiment may be used on another embodiment to yield a still further embodiment. Thus, it is intended that the present invention covers such modifications and variations as come within the scope of the appended claims and their equivalents.

Referring to FIG. 1, a signal control device 10 generally comprises a body 12 with a generally cylindrical cavity 14, first and second spools 16 and 18 positioned within cavity 14, a first input 20, a second input 22, a third input 24, a first output 26 and a second output 28. In the illustrated embodiment, first and second inputs 20 and 22 and first and second outputs 26 and 28 are shown as being pneumatic, where third input 24 is shown as being mechanical. However, it should be understood that the inputs and outputs of the present invention may be of any type known in the art, with suitable examples including pneumatic, hydraulic or mechanical. Generally cylindrical cavity 14 defines a longitudinal axis (not shown).

Generally cylindrical cavity 14 is shown divided into three separate portions 30, 32 and 34. From left to right, first portion 30 is defined as the area between first input 20 and a first spool end 16a. Second portion 32 is the area between a first spool second end 16b and second spool first end 18a. Third portion 34 is the area located between second spool second end 18b and third input 24.

First spool 16 and second spool 18 each define a central axis (not shown) that is generally collinear with each other and the central axis of cylindrical cavity 14. The spools are generally cylindrical in shape and typically have a diameter less than the diameter of cylindrical cavity 14. First spool 16 has first end 16a and second end 16b, each of which define a recess 16c and 16d. A restraining device 36 is placed within first spool first recess 16c and exits at first spool second recess 16d. Restraining device 36 connects first spool 16 and second spool 18 so that they move axially within cavity 14 with respect to one another. In some embodiments, restraining device 36 may further comprise a spring 38 received about restraining device 36, where one end of the spring abuts first spool 16 and the opposite end abuts spool 18. Suitable springs may include die springs, Belleville springs, wave springs, coil springs or any other suitable spring for biasing first spool 16 and second spool 18 apart from one another. Additionally, the spring material may be chosen from any suitable material such as metal alloys, stainless steel, polymers and elastomers.

Second spool 18 has first end 18a and second end 18b. Second spool 18 also defines a bore 40 that has a first opening 40a (FIGS. 1 and 2) intermediate second spool first end 18a and first spool second end 16b, and a second opening 40b that opens into cavity 14. First and second spools 16 and 18 have respective seals 42 received in respective grooves (not numbered) or other features to aid in maintaining proper placement of the seals on the spools while in use. Seals 42 provide a fluid seal between the various body cavity portions 30, 32 and 34.

Figure 2:
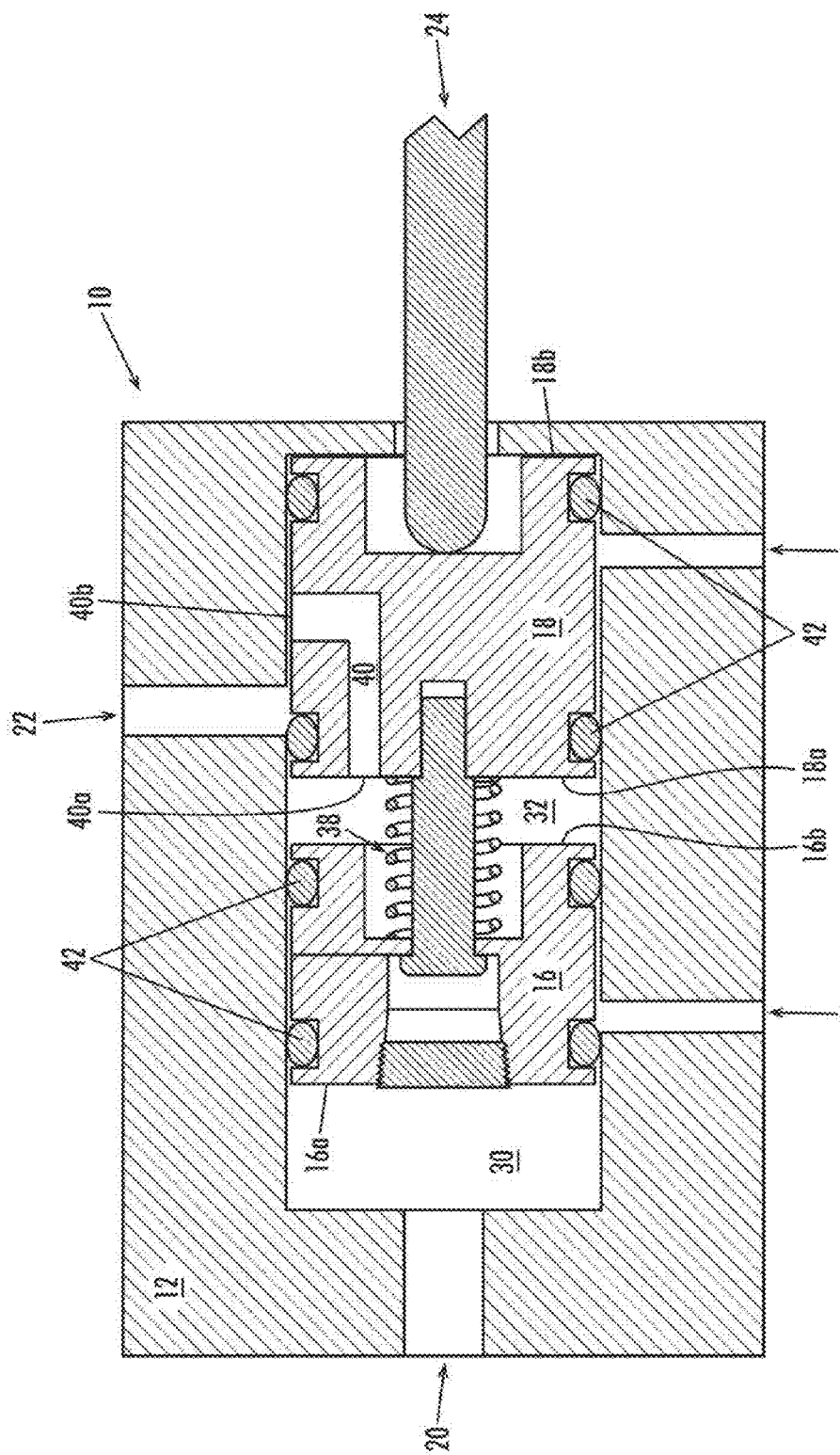
FIG. 2 is a cross-sectional view of the signal control device of FIG. 1 with its components in a second position.
Figure 3:
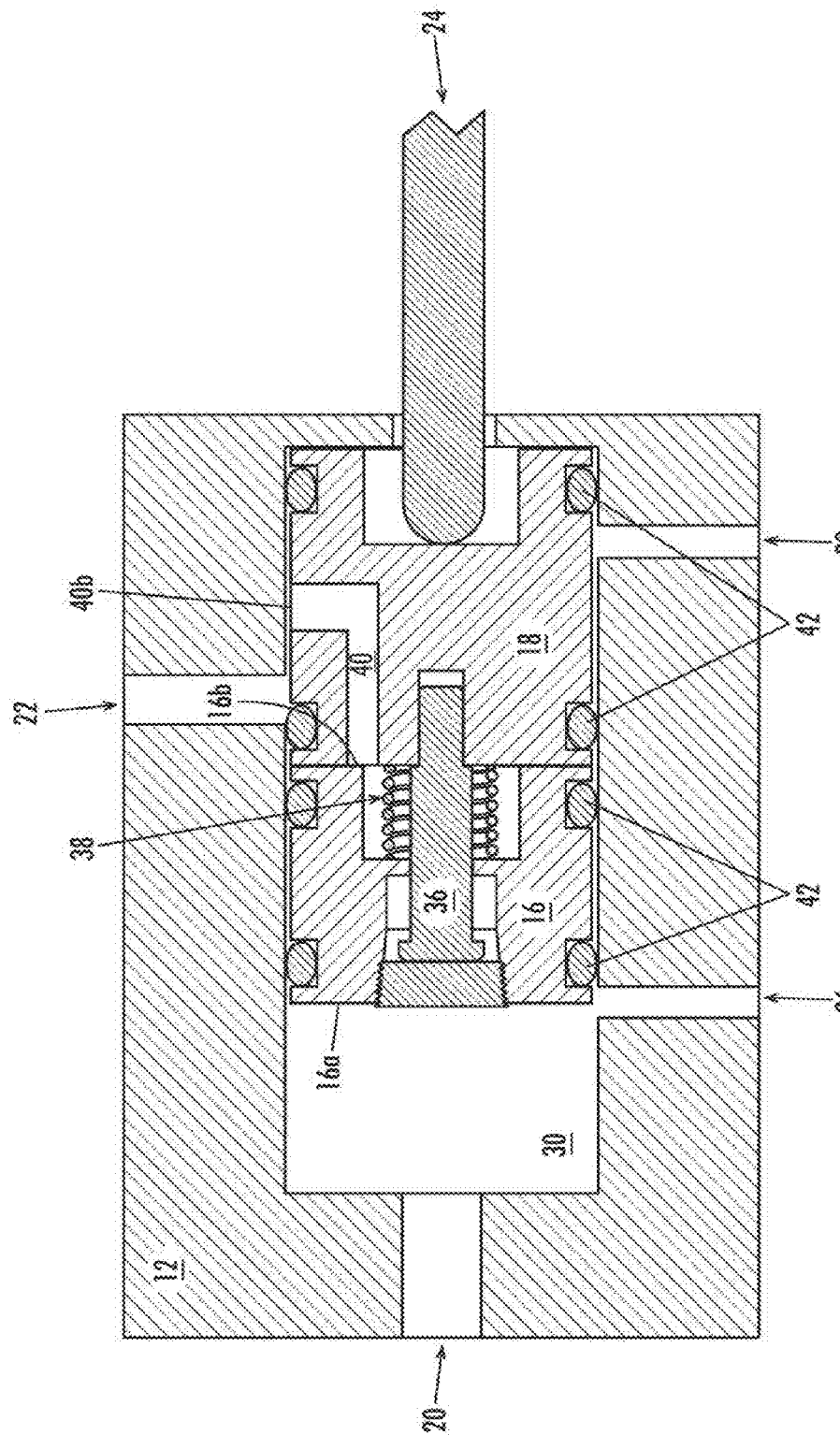
FIG. 3 is a cross-sectional view of the signal control device of FIG. 1 with its components in a third position.

The operation of the signal control device is described herein with reference to FIGS. 1-3, and is defined by the positioning of first and second spools 16 and 18 within cylindrical cavity 14. Referring to FIG. 1, first spool 16 and second spool 18 are located in a first position where first input 20 is in fluid communication with first cavity portion 30, second input 22 is in fluid communication with second cavity portion 32 through bore 40, and third cavity portion 34 is in fluid communication with output 28. In this position, the force of third input 24 is greater than the combined force of first input 20, second input 22 and spring 38, and first cavity portion 30 is isolated from first output 26 by first spool seal 42. Air from second input 22 flows through bore 40 and fills second cavity portion 32 thereby biasing first spool 16 apart from second spool 18 in conjunction with the force of spring 38. Since the force of the third input 24 is greater than the combined force of first input 20, second input 22 and the force of spring 38, the volume of first cavity portion 30 is substantially zero.

Referring to FIG. 2, as the amount of pressure increases at input 20, first and second spools 16 and 18 move to the right, relative to body 12. FIG. 2 represents the position of first and second spools 16 and 18 in a second position as the pressure at first input 20 is increased. In this second position, a greater amount of force is supplied to the combination of first input 20 and second input 22 than is supplied to the third input 24, which causes spools 16 and 18 to shift to the right. Consequently, first input 20 is still in fluid communication with first cavity portion 30 but, the volume of cavity 30 has increased to accommodate the increased pressure applied at first input 20. Input 20 is neither in fluid communication with first output 26 nor second output 28. Moreover, because spool 18 shifted far enough to the right, second output 28 is now positioned between second spool o-rings 42. Because second input 22 is also positioned between second spool o-rings 42, second input 22 is now in fluid communication with second output 28, and in fluid communication with cavity portion 32 through bore 40. As a result, because second cavity portion 32 has relatively the same volume as it did in the first position, any increased pressure in body cavity portion 32 bleeds off through second output 28.

Referring to FIG. 3, as an even greater amount of pressure is supplied to first input 20, first spool 16 moves relative to second spool 18 into contact with the second spool into a third position. In this third position, the supplied force at first input 20 is greater than the combination of force supplied to second input 22, spring 38, and third input 24. This causes spool 16 to move to the right relative to second spool 18 so that first output 26 is located to the left of first spool o-rings 42. Second output 28 remains positioned intermediate second spool o-rings 42. Thus, in the third position, first input 20 is in fluid communication with first output 26, and second input 22 is in fluid communication with second output 28. The volume of second cavity portion 32 and third cavity portion 34 are substantially zero, and the volume of first cavity portion 30 increases.

As described above, the first and second spools may each contain seals that are used to ensure proper fluid communication between the inputs and outputs based on the relative position of the spools with respect to body 12. If seals are not used, other embodiments of the invention may be utilized to ensure proper fluid communication between various inputs and outputs. For example, the diameter of the spools may be large enough to restrict fluid communication between the inputs and outputs when necessary but still be of a suitable diameter to allow movement of the spools within the cavity. Additionally, other suitable seals may be formed integral with the outer circumference of the spools, or may be fit around or in a groove formed in the outer circumference of the spools.

Those having skill in the art will also recognize additional embodiments of the present invention. For example, varying numbers of inputs and outputs can be used. In some embodiments, only one input and one output may be utilized, while in other embodiments multiple inputs and/or outputs may be used. The particular application of the present invention will dictate the necessary embodiment and the number of inputs and outputs.

Figure 4:
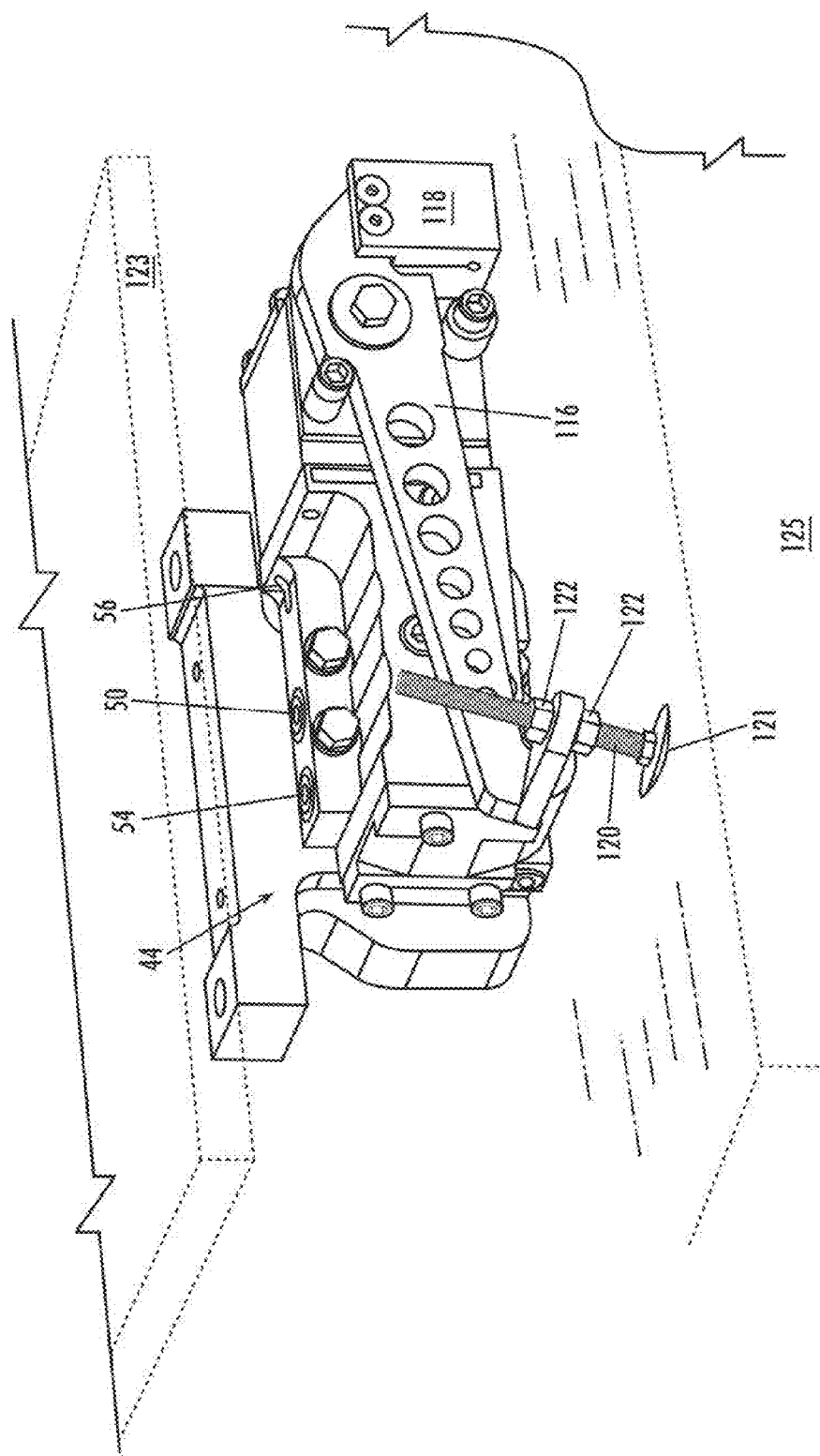
FIG. 4 is a perspective view of a proportional valve signal control device in accordance with an embodiment of the present invention.
Figure 5:
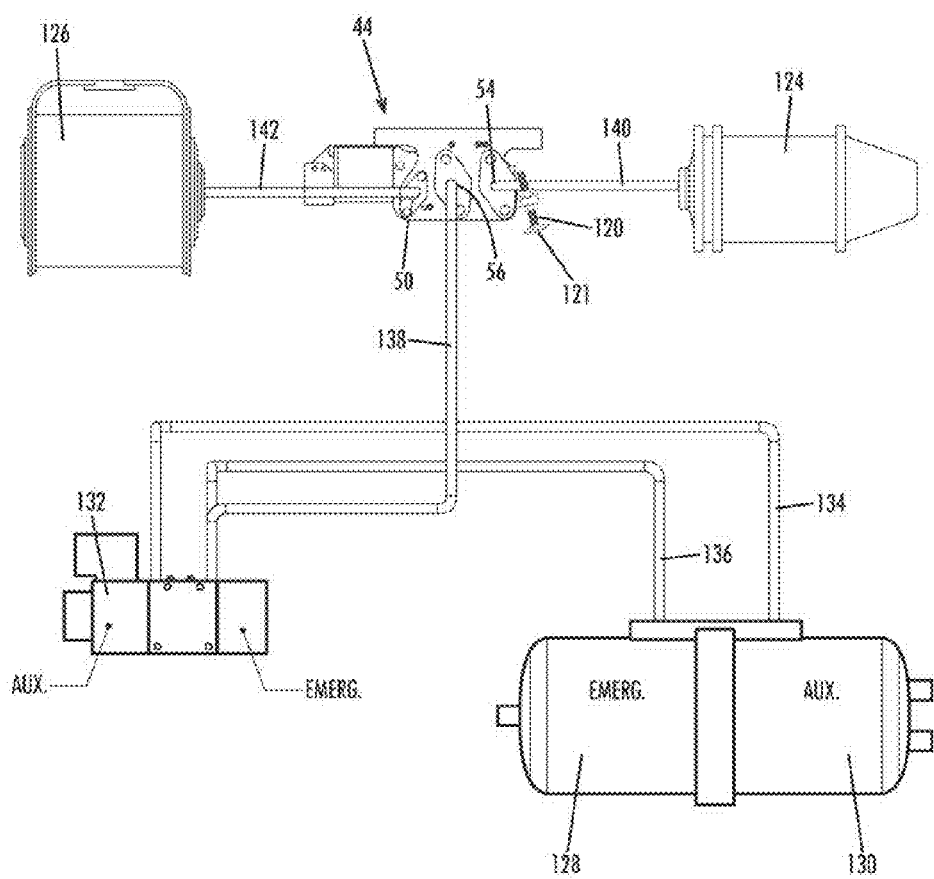
FIG. 5 is a schematic view of a railcar brake system for use with the proportional valve of FIG. 4.

Referring to FIGS. 4-5, one example of a use of the signal control device is illustrated in the form of a proportional valve 44 operatively connected to a railway car 123 for controlling the braking force applied to the railway car wheels (not shown). Proportional valve 44 may be used in conjunction with a wheel chassis 125, a first and second set of wheels (not shown), and a brake (not shown) that is operatively connected to at least one or both of the first and second set of wheels (not shown) by a braking system, as shown in FIG. 5.

Referring to FIG. 5, the brake system has a brake cylinder 124 that applies braking force to one or both sets of railway car wheels when the brake is engaged. Brake cylinder 124 and an air reservoir 126 are in fluid communication with each other through proportional valve 44. Additionally, an emergency reservoir 128 and an auxiliary reservoir 130 are coupled to proportional valve 44 through a control valve 132. In particular, a tubing 142 connects a first input 50 of proportional valve 44 to an air reservoir 126. Tubing 140 connects a first output 54 of the proportional valve to brake cylinder 124. Finally, tubing 134, 136 and 138 connects a second output 56 of proportional valve 44 to the emergency and auxiliary reservoirs through control valve 132.

Referring again to FIG. 4, proportional valve 44 typically mounts to an underside of railway car 123. In this configuration, an input to the proportional valve is operatively coupled to wheel chassis 125 so that movement of the railway car with respect to the wheel chassis may be detected. It should be understood that for purposes of the invention, proportional valve 44 may, instead, mount to wheel chassis 125 so that an input is operatively coupled to the railway car to detect movement between the railway car and the wheel chassis. It should be understood that while this figure illustrates the valve body mounted to the top of the wheel chassis, it could also be mounted to the railway car, and the embodiment illustrated is merely for purposes of explanation.

An arm 116 having an adjustable pin 120 and cap 121 operatively couples a second mechanical input of proportional valve 44 to wheel chassis 125. Two adjusting nuts 122 threadably received on adjustable pin 120 allow the length of the pin between arm 116 and the railway car to be changed. As the weight of the railway car varies due to the changes in cargo carried in the railway car, the car may move up allowing arm 116 to move downward, or in the alternative the car may move down thereby biasing arm 116 upward with respect to the valve body. That is, as the weight of the cargo increases or decreases, the proportional valve arm moves with respect to valve body affecting the operation of the braking system.

Figure 6:
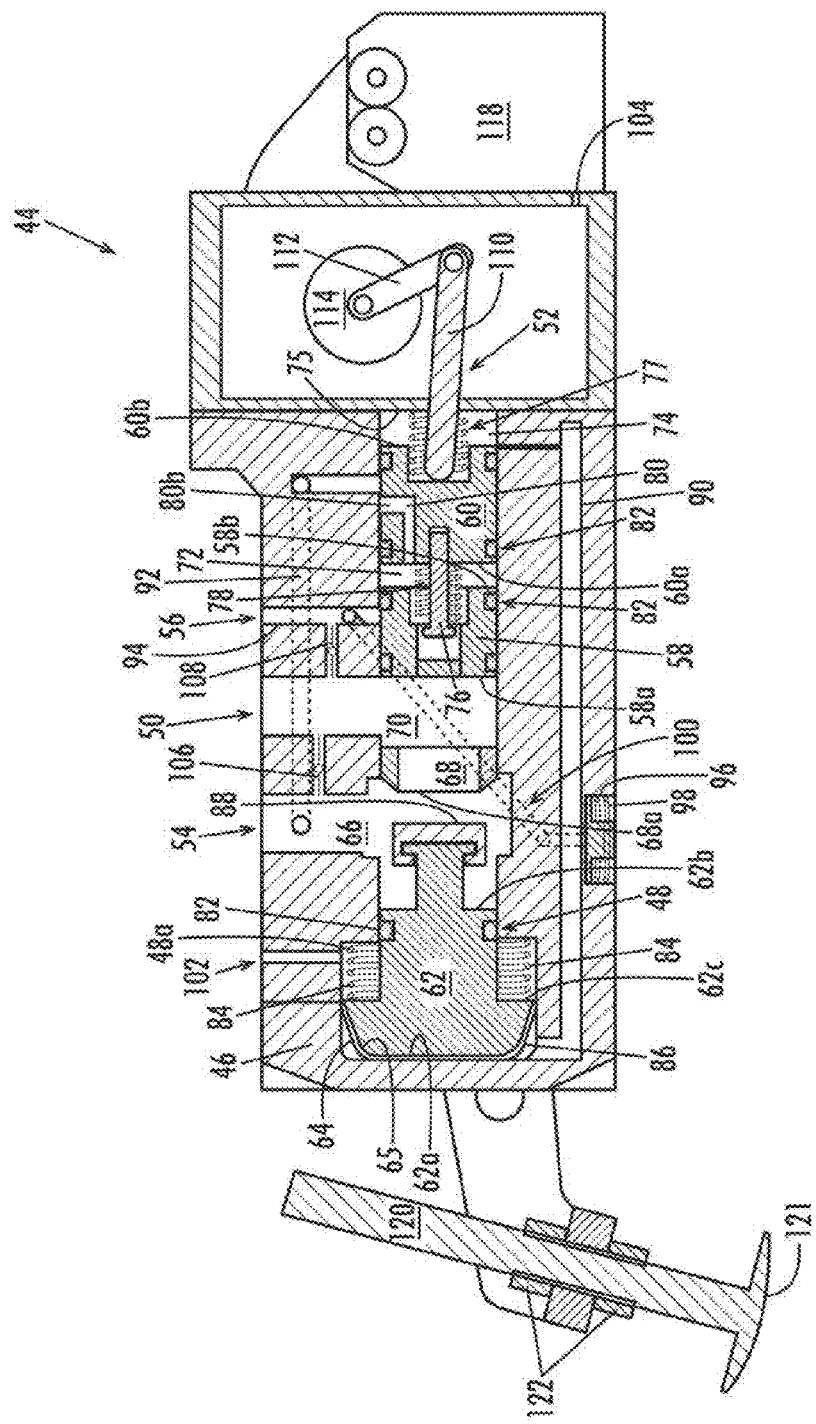
FIG. 6 is a cross-sectional view of a proportional valve with its components in a first position in accordance with an embodiment of the present invention.
Figure 7:
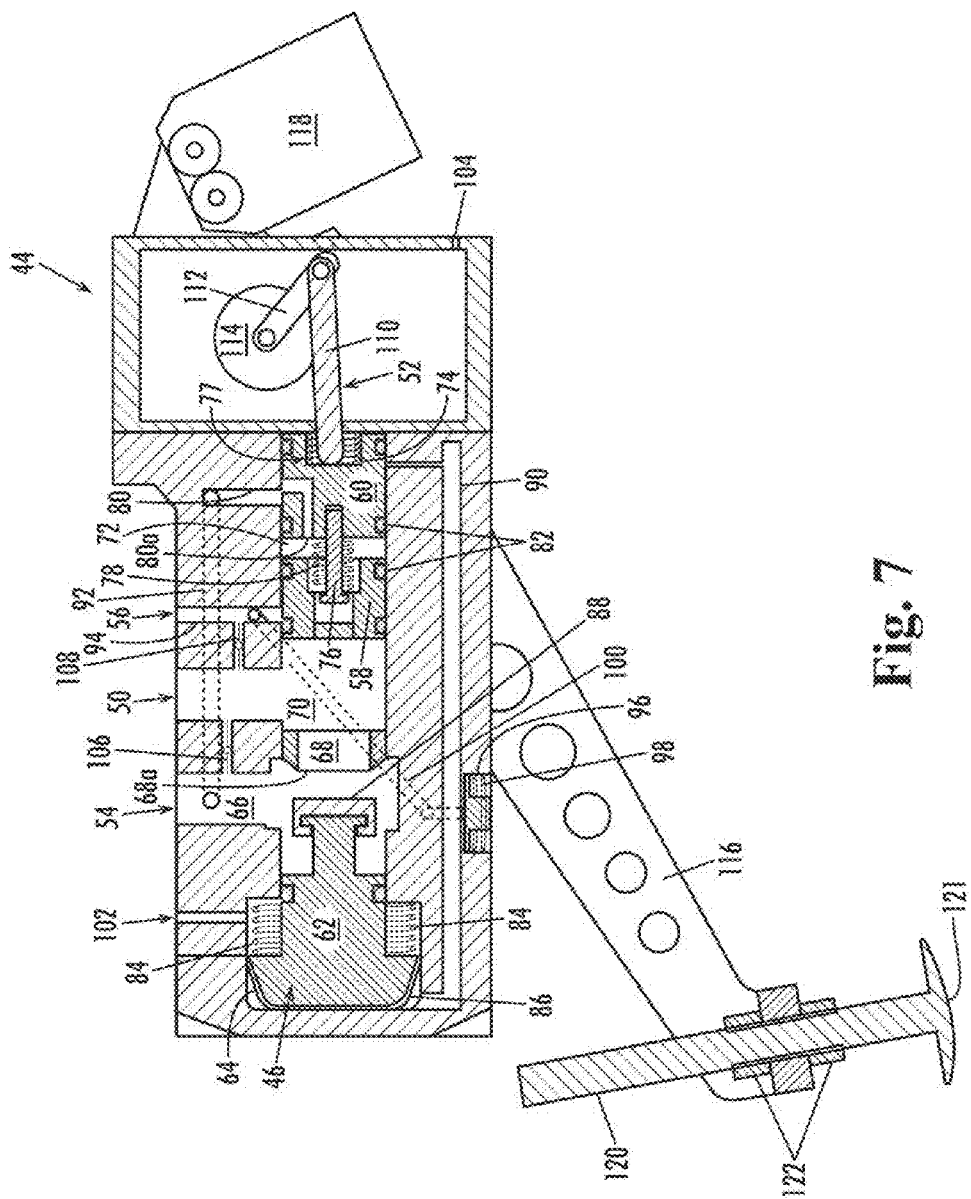
FIG. 7 is a cross-sectional view of the proportional valve of FIG. 4 with its components in a second position.

Referring to FIGS. 6-8, the proportional valve generally has a body 46 having a generally cylindrical cavity 48 defining a central axis (not numbered), first input 50, second input 52, first output 54, second output 56, a first spool 58, a second spool 60 and a piston 62. Referring in particular to FIG. 6, generally cylindrical cavity 48 is shown divided into six cavity portions. From left to right, the area between a wall 65 of the body and a first end 62a of piston 62 defines a first cavity portion 64. A second cavity portion 66, a third cavity portion 68 and a fourth cavity portion 70 are in fluid communication with each other and are located intermediate a second end 62b of piston 62 and a first end 58a of first spool 58. A fifth cavity portion 72 is located intermediate a second end 58b of first spool 58 and a first end 60a of second spool 60. Finally, a sixth cavity portion 74 is located intermediate a second end 60b of second spool 60 and a second wall 75 of body 46.

First spool 58 and second spool 60 each define a central axis that is collinear with the central axis of cylindrical body cavity 48. Each spool is generally cylindrical in shape and typically has a diameter slightly less than the diameter of cylindrical cavity 48. First spool first end 58a and first spool second end 58b each define a recess therein that together form a through-hole in the spool. A first restraining device 76 is positioned within first spool first end 58a and exits through first spool second end 58b. First restraining device 76 operatively couples first spool 58 and second spool 60 so that they can move axially within body cavity 48 with respect to body 46 and with respect to one another.

In some embodiments, the restraining device may further comprise a spring 78 positioned about restraining device 76 intermediate first spool 58 and second spool 60. Suitable springs may include die springs, Belleville springs, wave springs, coil springs, or any other suitable spring for biasing the first and second spools apart from one another. Additionally, the spring material may be chosen from any suitable material such as metal alloys, stainless steel, polymers and elastomers. Second spool 60 contains a bore 80 that has a first opening 80a (FIG. 7) that opens at second spool first end 60a and a second end 80b that opens intermediate second spool first end 80a and second spool second end 80b.

First and second spools 58 and 60 may contain seals 82 positioned in respective grooves (not numbered) formed in the outer circumference of the spools. The seals may be mounted in other suitable ways so that the seals are maintained in a fixed position on the spools when the spools move within body cavity 48. Seals 82 may be formed from any suitable material for forming an air fluid tight seal depending on the application of the proportional valve. Suitable materials include polymers and elastomer.

Piston 62 defines a central axis that is collinear with the central axis of body cylindrical cavity 48, spool 58 and spool 60. It should be understood that in some embodiments, the central axis of piston 62 is not required to be collinear with spools 58 and 60. Piston 62 is shown having a second restraining device 84 that is located intermediate piston first and second ends 62a and 62b. In particular, second restraining device 84 is operatively coupled at one end with a flange 62c defined by piston 62 and a ledge 48a defined by body 46 so that piston first end 62a is biased into cavity portion 64 away from body flange 48a. In one embodiment, restraining device 84 is a spring.

A diaphragm 86 is positioned over piston first end 62a, and piston second end 62b contains a proportional poppet 88 for contact with a wall 68a that bounds third cavity portion 68. As discussed in reference to first and second spools 58 and 60, piston 62 may also contain seals 82 to ensure a fluid tight seal between the piston and the wall of cavity 48. As with the seals of the first and second spools, piston seals 82 may be received in a groove or may be fastened to the outer circumference of the piston in any suitable manner that ensures that the seals remain axially fixed on the piston when the piston is moved within body cavity 48.

Body 46 may contain additional components such as a first passage 90 that provides fluid communication between first cavity portion 64 and sixth cavity portion 74. A second passage 92 provides fluid communication between second cavity portion 66 and fifth cavity portion 70 through second spool bore 80. A third passage 94 is located intermediate fourth cavity portion 70 and fifth cavity portion 72 and opens into output 56. Additionally, an indicator spring 98 operatively connects an indicator piston 96 to body 46. Indicator piston 96 is in fluid communication with a fourth passage 100, which is in fluid communication with third passage 94. Body 46 contains two atmosphere vents 102 and 104, the former positioned proximate second restraining device 84, and the latter positioned proximate second input 52. Check valves 106 and 108 may be located respectively intermediate second cavity portion 66 and fourth cavity portion 70, and intermediate fourth cavity portion 70 and third passage 94.

As discussed above, the embodiment of proportional valve 44 is shown having two inputs and two outputs. It should be understood that, depending on the application, any number of inputs or outputs may be included in any known form, suitable examples of inputs and outputs may include a combination of pneumatic, hydraulic, or mechanical. In one embodiment as shown in FIGS. 5 and 6, first input 50 is pneumatic and flows directly into fourth body cavity portion 70 through third body cavity portion 68. First output 54 and second output 56 are also pneumatic, where first output 54 is in fluid communication with second cavity portion 66.

Second input 52 is a mechanical input and operatively couples to second spool second end 60b. Second input 52 consists of a hinge link 112, a pushrod 110 and a sensor shaft 114, where hinge link 112 rotationally couples pushrod 110 to sensor shaft 114. A spring 77 surrounds pushrod 110 and is intermediate second spool second end 60b and body wall 75. An opposite side of sensor shaft 114 attaches to sensor arm 116. Sensor arm 116 is coupled to a counter weight 118 on one end and is operatively coupled to railway car 123 (FIG. 4) on the other end by sensor adjusting pin 120 and lock nuts 122.

The operation of the proportional valve is described with references to FIGS. 6-8. As described above, sensor arm 116 is operatively connected to wheel chassis 125 (FIG. 4) and senses the amount of weight carried within the railway car by detecting relative movement of the railway car with respect to the wheel chassis. If the railway car is more than 25% loaded, sensor arm 116 is biased upward in a relative parallel fashion with respect to body 46, a first position (FIG. 6). In this first position, first input 50 is in fluid communication with first output 54 by third body cavity portion 68. That is, air from first input 50 travels into fourth body cavity portion 70, through third cavity portion 68, and fills second cavity portion 66. Once second cavity portion 66 fills, air is forced through second passage 92 into fifth cavity portion 72 through second spool bore 80. Piston seal 82 and first and second spool seals 82 prevent air from entering first cavity portion 64 and six cavity portion 74 through first passage 90. Thus, the volume of first cavity portion 64 is substantially zero. In the first position, substantially one hundred percent of the air charge from reservoir 126 (FIG. 4) is applied to first input 50, fills fourth, third, and second body cavity portions 70, 68 and 66, and exits first output 54 to brake cylinder 124 (FIG. 4). More particularly, when the proportional valve is in the first position, the full air charge from reservoir 126 is applied to the brake mechanism so that full braking force is applied to the wheels.

Referring to FIG. 7, when the weight of the railway car is less than 25% of its filled capacity the railway car moves upward relative to the wheel chassis (FIG. 4). This in turn allows sensor arm 116 to move out of the first position causing push rod 110 to move to the right, thereby decreasing the input force exerted by pushrod 110 on second spool 60. Consequently, second spool 60 is biased to the right against the force of spring 77. As in the first position, the second position initially allows first input 50 to be in fluid communication with first output 54. Thus, air travels and fills second, third and fourth body cavity portions 66, 68 and 70. In addition, similar to the first position, air also travels through second passage 92 into fifth body cavity portion 72 through second spool bore 80. However, because second spool 60 has shifted to the right so that first passage 90 is positioned intermediate second spool seals 82, first passage 90 is now in fluid communication with second passage 92 and with fifth cavity portion 72 through second spool bore 80. In the second position, the volume of sixth cavity portion 74 is reduced substantially to zero, and the volume of fifth cavity portion 72 is relatively the same as in the first position. However, the orientation of fifth cavity portion 72 with respect to body 46 has shifted to the right.

Referring to FIG. 8, as the air pressure begins to equalize throughout the proportional valve, the volume of first cavity 64 begins to increase as piston 62 moves to the right against the bias of second restraining device 84. Piston 62 will continue to move to the right until proportional poppet 88 abuts third body cavity portion wall 68a, thereby restricting airflow between second cavity portion 66 and third cavity portion 68. As a result, first input 50 is no longer in fluid communication with first output 54, thereby limiting the amount of air pressure delivered to brake cylinder 124 (FIG. 5).

As additional air pressure is delivered from reservoir 126 (FIG. 5) through first input 50, pressure builds in fourth cavity portion 70 forcing first spool 58 to the right against the bias of first restraining device 76 until first spool 58 comes into contact with second spool 60. Once first spool 58 abuts second spool 60, second output 56 is in fluid communication with fourth body cavity portion 70 and fourth passage 100. Because fourth passage 100 is in fluid communication with fourth cavity portion 70, air travels through fourth passage 100 and moves indicator piston 96 out of the body 46 against the bias of indicator spring 98. Indicator piston 96 conveys to the user that the proportional valve is in use since the weight of the railway car is less than the predetermined load weight. Once proportional valve 44 reaches equilibrium, any additional pressure at first input 50 will bleed off through second output 56 into auxiliary reservoir 130 (FIG. 5). Thus, the system is maintained in a state of equilibrium where some portion of the input pressure is delivered to brake cylinder 124.

As mentioned above, the amount of braking force necessary to stop a loaded railway car differs depending on the load being carried by the railway car. The amount of pressure that is released to brake cylinder 124 (FIG. 5) in the third position is proportionally less than that when in the first position. The reason, as known to those skilled in the art, is to provide a proportional amount of braking pressure based on the weight of the railway car. The amount of pressure necessary to provide proper braking in a car that is loaded at less than 25% of its full capacity can vary based on the selection of certain components of the proportional valve. For example, the strength of first and second restraining devices 76 and 78 can be adjusted to regulate the amount of pressure needed at first input 50 to move piston 62 and spools 58 and 60 into the second and third positions. That is, the greater the input pressure necessary to move the spools and piston against the force of the restraining devices, the higher the pressure that will be delivered to the braking system, thereby increasing the braking force applied to the wheels. Consequently, braking force is directly proportional to the spring force of the restraining devices.

Once the pressure is released to the braking cylinder, check valves 106 and 108 release the remaining pressure built up in fourth cavity portion 70. As pressure is released, the proportional valve components move back to the first position where first input 50 is in fluid communication with first output 54, as shown in FIG. 6.

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole and in part. Furthermore, those of ordinary skill in the art will appreciate that the foregoing description is by way of example only, and is not intended to limit the invention so further described in such appended claims. Therefore, the spirit and scope of the appended claims should not be limited to the description of the preferred versions contained therein.

What we claim is:

1. A signal control device comprising:
   a body defining a cavity having a longitudinal central axis, said body having,
      a first input in fluid communication with said cavity,
      a second input in fluid communication with said cavity,
      a third input,
      a first output in fluid communication with said cavity,
      a second output in fluid communication with said cavity,
   a first spool disposed in said body cavity having,
      a first end,
      an opposite second end,
      a first central axis extending between said first spool first and second ends,
   a second spool disposed in said body cavity having,
      a first end,
      an opposite second end,
      a second central axis extending between said second spool first and said second ends,
      a bore formed in said second spool, said bore having,
         a first end opening at said second spool first end, the first end opening being radially offset from the second central axis of said second spool and opening into a portion of said body cavity that is disposed between said first spool and said second spool, and
         a second end opening intermediate said second spool first end and said second spool second end;
   a regulating device including a spring with a first end and an opposite second end, said spring being disposed between said first spool and said second spool so that said first end of said spring abuts said first spool and said second end of said spring abuts said second spool, said regulating device biasing said first spool away from said second spool; and
   a restraining device with a first end adjacent said first spool and a second end adjacent said second spool, said first spool being slidable axially along said restraining device,
      wherein said first spool and said second spool are operatively coupled to one another and positioned in said body cavity so that said first spool first central axis and said second spool second central axis are substantially collinear, and
      said first and second spools are selectively positionable within said body cavity so that:
         when said first and second spools are in a first position, a force of said third input is greater than a combined force of said first input, said second input, and said regulating device, and said first input is isolated from said first output, and said second input is isolated from said second output;
         when said first and second spools are in a second position, a combined force of said first input and said second input is greater than a force of said third input, and said first input is isolated from said first output, and said second input is in fluid communication with said second output; and
         when said first and second spools are in a third position, a force of said first input is greater than a combined force of said second input, said third input, and said regulating device, and said first input is in fluid communication with said first output, and said second input is in fluid communication with said second output.

2. The signal control device of claim 1, wherein said first spool and said second spool move axially in said body relative to one another.

3. The signal control device of claim 1, wherein said first input and said second input are selected from the group consisting of pneumatic, mechanical and hydraulic.

4. The signal control device of claim 1, wherein,
   a first end of said spring is connected to said first spool second end, and
   an opposite second end of said spring is operatively connected to said second spool first end,
      wherein the regulating device controls the amount of input necessary to move said first and second spools between said second position and said third position.

5. A signal control device comprising:
   a body having a generally cylindrical cavity defining a central axis,
      a first input in fluid communication with said cavity,
      a second input in fluid communication with said cavity,
      a third input,
      a first output in fluid communication with said cavity,
      a second output in fluid communication with said cavity, and
   a first spool disposed in said cavity, having,
      a first end,
      an opposite second end, and
      a first central axis therebetween,
   a second spool disposed in said cavity, said second spool being operatively connected to said first spool so that said first spool can move relative to said second spool, said second spool having,
      a first end,
      an opposite second end,
      a second central axis formed therebetween, and
      a bore formed therein having,
         a first opening at said second spool first end, the first end opening being radially offset from the second central axis of said second spool and opening into a portion of said cavity that is disposed between said first spool and said second spool, and
         a second opening intermediate said second spool second end and said second spool first end,
   a regulating device including a spring with a first end and an opposite second end, said spring being disposed between said first spool and said second spool so that said first end of said spring abuts said first spool and said second end of said spring abuts said second spool, said regulating device biasing said first spool away from said second spool, wherein, said first spool and said second spool are positioned in said body so that said first spool first central axis and said second spool second central axis are collinear, and said first and second spools are selectively positionable within said body cavity so that;

when said first and second spools are in a first position, a force of said third input is greater than a combined force of said first input, said second input, and said regulating device, and said first input is isolated from said first output, and said second input is isolated from said second output;

when said first and second spools are in a second position, a combined force of said first input and said second input is greater than a force of said third input, and said first input is isolated from said first output, and said second input is in fluid communication with said second output; and when said first and second spools are in a third position, a force of said first input is greater than a combined force of said second input, said third input, and said regulating device, and said first input is in fluid communication with said first output, and said second input is in fluid communication with said second output, and said first spool second end contacts said second spool first end.

6. The signal control device of claim 5, wherein said third input is operatively coupled to said second spool, and wherein said first and said second inputs are selected from the group consisting of pneumatic, mechanical, hydraulic, and combinations thereof.

7. The signal control device of claim 5, further comprising a first seal received in a first groove formed proximate said first spool first end, a second seal received in a second groove formed proximate said first spool second end;

a third seal received in a third groove formed proximate said second spool first end; and a fourth seal received in a fourth groove formed proximate said second spool second end.

8. A railway car having a signal control proportional valve for controlling the braking force applied to the railway car wheels, comprising:

a wheel chassis, a first set of wheels operatively coupled to said chassis;

a second set of wheels operatively coupled to said chassis;

a brake operatively connected to at least one of said first set of wheels and said second set of wheels, said brake comprising, a brake cylinder, and a proportional valve operatively connected between said brake cylinder and said wheel chassis, said proportional valve further comprising, a body having a cavity defining a central axis, a first input in fluid communication with said cavity;

a second input in fluid communication with said cavity;

a third input;

a first output in fluid communication with said cavity;

a second output in fluid communication with said cavity; and a first spool disposed in said cavity, having, a first end, an opposite second end, a first central axis therebetween, a second spool disposed in said cavity, said second spool being operatively connected to said first spool so that said first spool can move relative to said second spool, said second spool having, a first end, an opposite second end that is operatively coupled to said second input, a second central axis formed therebetween, and a bore formed therein having, a first opening at said second spool first end, the first end opening being radially offset from the second central axis of said second spool and opening into a portion of said cavity that is disposed between said first spool and said second spool, and a second opening intermediate said second spool first end and said second spool second end, a piston having a first end, a second end, a central longitudinal axis extending between said first and said second ends, and a first regulating device including a spring with a first end and an opposite second end, said spring being disposed between said first spool and said second spool so that said first end of said spring abuts said first spool and said second end of said spring abuts said second spool, said spring biasing said first spool away from said second spool, wherein, said first spool, said second spool and said piston are operatively received and positioned in said body so that said first spool first central axis, said second spool second central axis and said piston central axis are generally collinear, and said first and second spools are selectively positionable within said body cavity so that:

when said first and second spools are in a first position, a force of said third input is greater than a combined force of said first input, said second input, and said regulating device, and said first input is isolated from said first output, and said second input is isolated from said second output;

when said first and second spools are in a second position, a combined force of said first input and said second input is greater than a force of said third input, and said first input is isolated from said first output, and said second input is in fluid communication with said second output; and when said first and second spools are in a third position, a force of said first input is greater than a combined force of said second input, said third input, and said regulating device, and said first input is in fluid communication with said first output, and said second input is in fluid communication with said second output and said first spool second end contacts said second spool first end.

9. The railway car of claim 8, wherein an area of said body cavity adjacent to said second spool second end is in fluid communication with an area of said body cavity adjacent said piston first end by a first passage formed through said body.

10. The railway car of claim 9, wherein an area of said body cavity intermediate said first spool second end and said second spool first end is in fluid communication with an area adjacent said first output by a second passage formed through said body.

11. The railway car of claim 8, wherein said first spool, said second spool and said piston move axially in said body relative to one another.

12. The railway car of claim 8, further comprising
a first seal received in a first groove formed proximate said first spool first end,
a second seal received in a second groove formed proximate said first spool second end;
a third seal received in a third groove formed proximate said second spool first end,
a fourth seal received in a fourth groove formed proximate said second spool second end, and
a fifth seal received in a fifth groove intermediate said piston first and second ends.

13. The railway car of claim 9, said piston further comprising a diaphragm positioned intermediate said piston first end and the area of said body cavity adjacent said piston first end.

14. The railway car of claim 8, wherein said first output is located intermediate said first spool first and second ends.

15. The railway car of claim 8, wherein
said brake cylinder is operatively coupled to said first output; and
said first input is operatively coupled to an air reservoir mounted to said railway car.

16. The railway car of claim 8, wherein said first and said second spools and said piston are generally cylindrically shaped in cross-section taken perpendicular to said respective central axis.

17. The railway car of claim 8, wherein said second input is operatively coupled to said railway car so that as the weight of cargo changes, the amount of input force at said second input changes.

18. The railway car of claim 8, wherein the first input is selected from the group consisting of pneumatic, mechanical, and hydraulic.

* * * * *